(12) United States Patent
Li

(10) Patent No.: US 7,757,804 B1
(45) Date of Patent: Jul. 20, 2010

(54) PEDESTRIAN VEHICLE COLLISION SAFETY SYSTEM

(76) Inventor: Phillip S. Li, 6302 Fort Hamilton Pkwy., Brooklyn, NY (US) 11219

( * ) Notice: Subject to any disclaimer, the term of this patent is extended or adjusted under 35 U.S.C. 154(b) by 274 days.

(21) Appl. No.: 12/151,269

(22) Filed: May 5, 2008

(51) Int. Cl.
*B60R 21/34* (2006.01)
(52) U.S. Cl. .................. 180/274; 280/748; 296/187.04; 296/187.09
(58) Field of Classification Search .................. 293/118, 293/119, 142, 145; 296/187.09, 187.04; 280/748; 180/274
See application file for complete search history.

(56) References Cited

U.S. PATENT DOCUMENTS

| | | | | |
|---|---|---|---|---|
| 4,946,002 | A * | 8/1990 | Vu et al. | 180/271 |
| 2004/0069555 | A1 * | 4/2004 | Yoneda | 180/274 |
| 2004/0262893 | A1 * | 12/2004 | Kempf et al. | 280/730.1 |

FOREIGN PATENT DOCUMENTS

| | | | |
|---|---|---|---|
| DE | 100 62 560 A1 | * | 7/2001 |
| DE | 102 13 116 A1 | * | 1/2003 |
| DE | 10221467 A | * | 12/2003 |
| JP | 2006-36120 A | * | 2/2006 |

* cited by examiner

*Primary Examiner*—Ruth Ilan
(74) *Attorney, Agent, or Firm*—Robert B. Famiglio, Esq.; Famiglio & Associates

(57) ABSTRACT

An injury mitigation system for a collision between a vehicle and a pedestrian. The invention includes a releasable net-like structure which is deployed from the front of a vehicle to alter the collision dynamics between the vehicle and the pedestrian is disclosed. A release mechanism allows deployment of the net which expands from a small compact size to a large rectangle in a deployed mode, expanding upward by an integrated spring-like structure which then shrouds the front of the vehicle in a short period of time. The system is activated upon sensing an imminent collision at short range in front of the vehicle through use of a motion sensor or other release mechanism.

3 Claims, 3 Drawing Sheets

PEDESTRIAN VEHICLE COLLISION SAFETY SYSTEM

BACKGROUND OF THE INVENTION

1. Field of the Invention

The present invention relates to a pedestrian safety device, and in particular, a pedestrian safety device deployed from automotive vehicles to mitigate collisions between pedestrians and vehicles.

2. Description of the Related Art

The present invention concerns an extended vehicle bumper-type apparatus that is designed to ride in front of a vehicle to buffer a collision between a vehicle and a pedestrian. Automotive vehicle bumper systems have always been designed primarily to absorb impact forces which may be generated during collisions between the automobile and a fixed structure such as a wall or other object with an unintended collision. Further, bumper systems and other impact absorption devices have been designed over the years to lessen impact forces generated between the collision of vehicles, normally at a slower speed. Such systems have been designed to allow controlled collapse of the bumper so that parking lot incidents or other slow speed collisions would have as little an economic impact as possible in the repair of the vehicle. Bumper systems are typically constructed of high strength metal frames, which are covered by flexible plastic material, and supported frequently by shock absorbing dampers, or other absorbers to deflect the impact or to allow as little damage as possible to occur to the bumper at a slow speed unintended impact.

While previous bumper designs, and those of the present art, have been effective in minimizing damage in vehicle to vehicle collisions or collisions between vehicles and fixed objects, pedestrian impacts have always been a serious concern and have not been well addressed. In many countries where there is far more pedestrian traffic on most streets than automobile traffic having an effective pedestrian collision avoidance or mitigation system would be desirable.

In some vehicle collisions with upright pedestrians, bumpers may contact with the pedestrians first through the front bumper of a vehicle, thereby concentrating much of the collision force in a narrow area, usually causing significant injury to the pedestrian in the area of the legs.

Bumpers have also been developed with additional cushion to reduce damaging impact with pedestrians, but one of the problems of such modified bumper design is it tends to increase the repair costs resulting from low speed impacts. A vehicle structure that is more pedestrian-friendly often conflicts with other customer requirements, such as increased bumper durability, styling and high speed aerodynamics. There are many systems which attempt to shift a bumper assembly in vertical orientation with the vehicle, or extend it out further while the vehicle is operating in an attempt to change the front geometry of the vehicle to make it more pedestrian friendly in the event of an unintended collision.

However, there is a need in the art to provide a simpler, less expensive solution for special applications which would require simpler technology to provide a vehicle pedestrian collision mitigation system to soften the impact of a collision with a pedestrian. Simple technology which is easily adaptable to existing automobiles of various sizes is needed to allow vehicles of all types to be retrofitted with a pedestrian collision safety system, if desired by the operator.

SUMMARY OF THE INVENTION

Accordingly, it is the principle object of the present invention to provide a rapidly deployable net-like system which allows for an interception of a unwary pedestrian prior to the impact of that pedestrian with a vehicle by catching the pedestrian in a net-like structure which distributes the impact force between the vehicle and the pedestrian in a fashion which would reduce inevitable injuries to the pedestrian.

It is also the object of the present invention to provide a net-like structure which extends horizontally and vertically in front of an operating vehicle to allow an unwary pedestrian to be captured within the net system and carried forward with the vehicle until the vehicle can completely stop, thereby avoiding or reducing the collision impact effects between the pedestrian and the hood or windshield of the striking vehicle.

The invention is comprised of a frame which extends a net-like structure up from under the vehicle's front bumper to trap an unweary pedestrian within the net-like structure thereby allowing the net structure to intercept a falling pedestrian within the net system. The invention is comprised of a frame-like rail system disposed under the front of a vehicle, which in a standby mode compresses a series of springs across the width of the front of the car, storing potential energy to eject a top rail which supports a net-like structure which extends upward from the front of the vehicle when released. Such a deployable net structure provides a soft barrier to cushion the rapid deceleration that is experienced by a pedestrian or animal being struck by an automobile or other vehicle.

The invention may use collision-sensing equipment such as short range Doppler radar or other currently available sensing technology to determine when a collision is about to occur. Upon such sensing, the rail-like structure extends outward by the release of a compression spring under the vehicle which drives the lower part of a frame structure forward, releasing the array of springs arranged in parallel across the top bar which is driven upward by the series of compressed springs thereby rapidly extending a net-like structure. When the net structure is in its maximum vertical extension, it provides a cushioning structure expanding into a net to provide an airbag-like open-air structure for pedestrian impact cushioning.

While the net structure may not necessarily prevent a collision between a pedestrian and the vehicle to which it is attached, it will reduce the impact and also provide a structure which begins to lift the pedestrian or other object such as a deer on the roadway in an upward direction to minimize damage by the collision with the pedestrian and the front bumper area of the striking vehicle. In the case of a large animal running across the path of a moving vehicle, the system helps mitigate the damage and danger present. A heavy deer or other animal striking a moving vehicle has killed drivers as the animal is propelled through the windshield without any restraints. The present invention is designed to mitigate the collision by changing the dynamics of the collision.

DETAILED DESCRIPTION OF THE INVENTION

Figure 1:
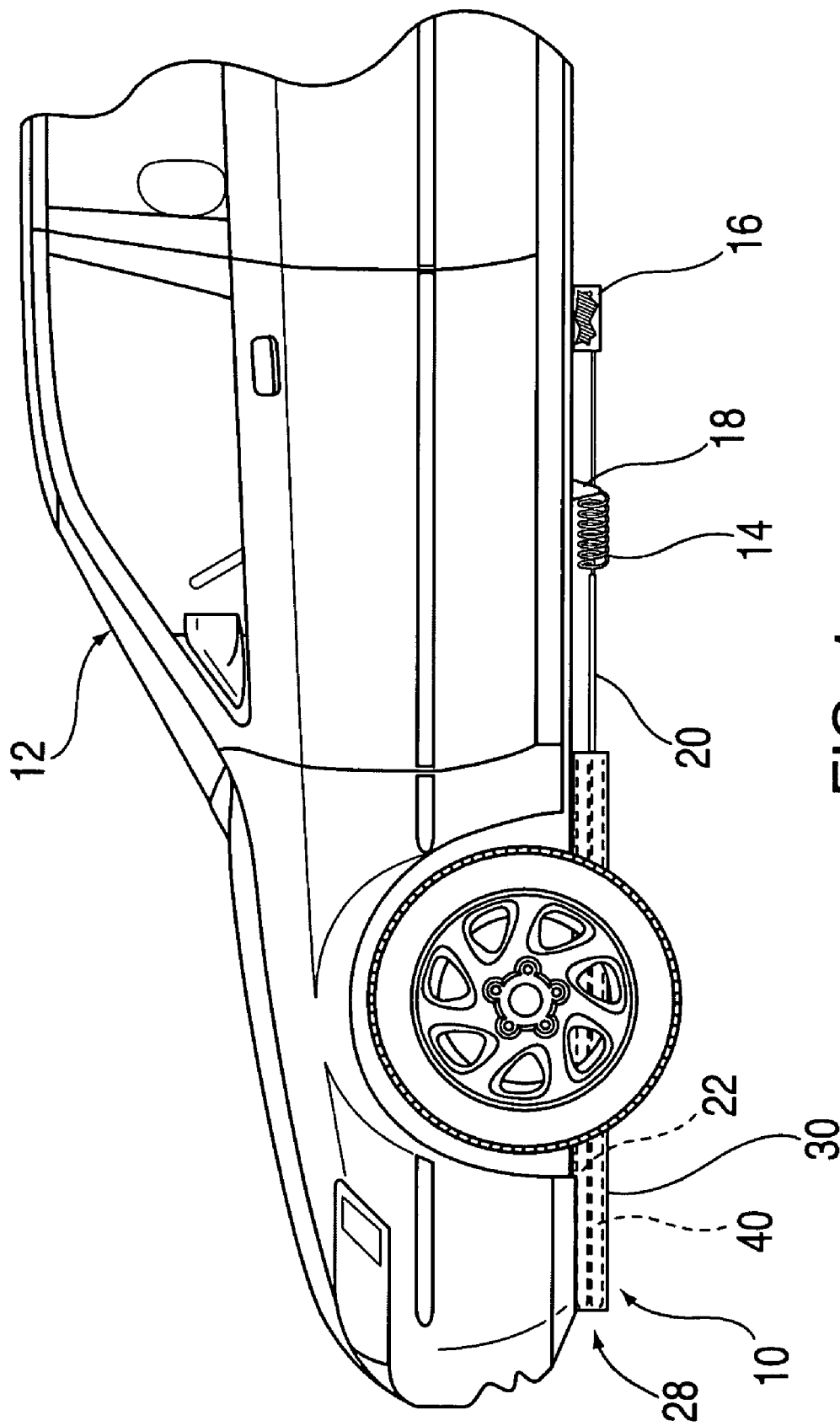
FIG. 1 is a side view of a vehicle illustrating the invention in its retracted form, ready to be deployed.

Now the invention will be described in detail with reference to the various figures wherein like numerals refer to like parts. Turning to FIG. 1, the entire net system 10 is shown fully retracted on vehicle 12 in an un-deployed position. Net system 10 is stowed in system housing 30 underneath the front area of vehicle 12. System 10 is poised under the vehicle to deploy rapidly to provide an expanded net cushion for intercepting an unweary pedestrian who may step in front of a moving vehicle.

Figure 2:
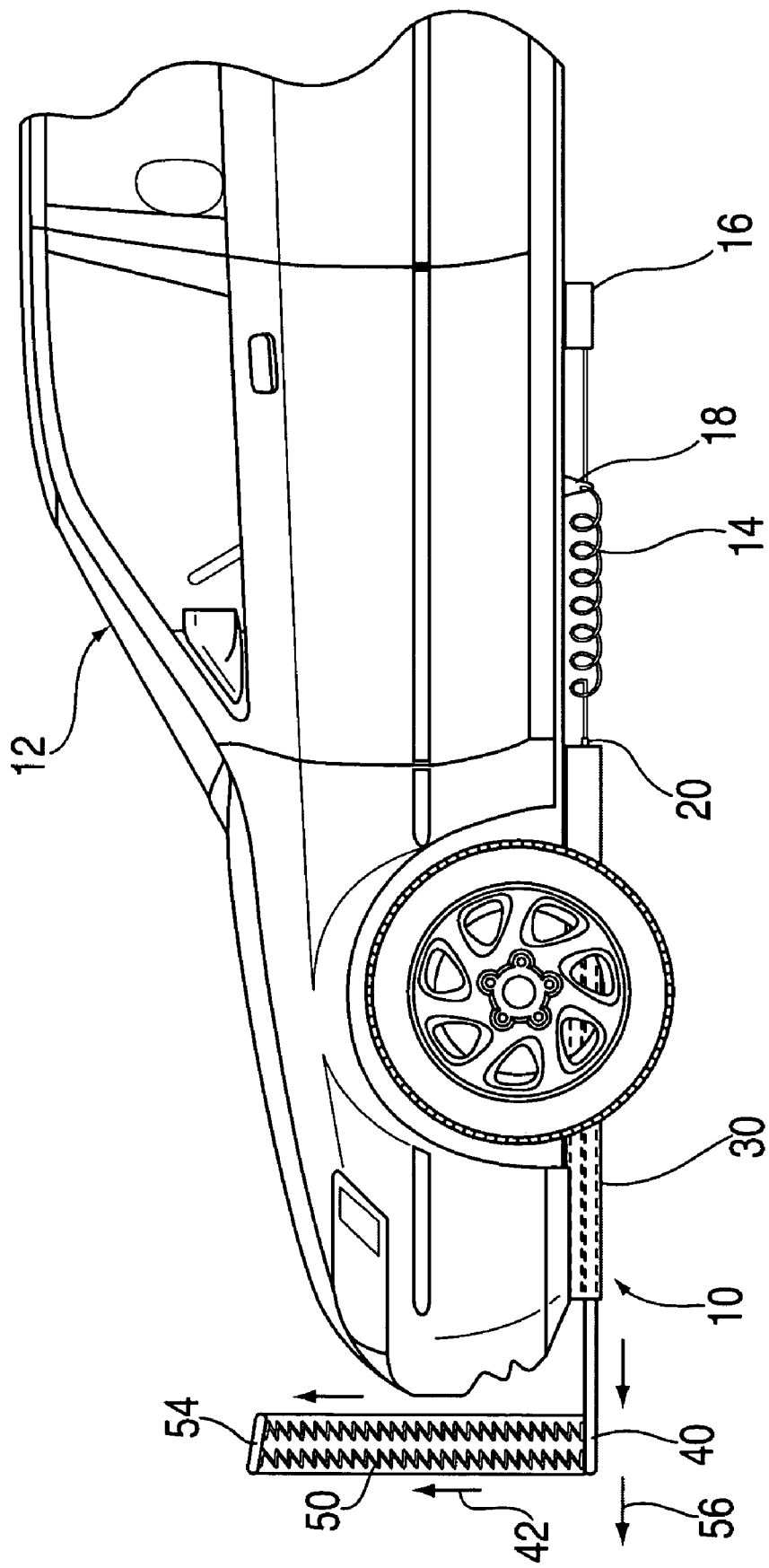
FIG. 2 is the apparatus shown in FIG. 1 in a deployed mode.

Net system 10 is comprised of deployment controller 16, deployment spring 14, spring anchor 18 and extension rod 20 which is used to propel lower track rail 40 in an outward direction upon deployment. Spring 14 is a spring biased in the retracted position such as to cause a thrust forward in extension rod 20 upon release of deployment controller 16. Deployment controller 16 is controlled by a variety of trigger mechanisms which will be described below. In the retracted position shown in FIG. 1, net system 10 is deployed by an outward thrust of lower track rail 40 within a fraction of a second for the purpose of releasing an array of springs 50 which are stored in a compressed position but upon being thrust forward top net frame 54 as shown in FIG. 2 is driven upwards by the array of springs 50 which act to deploy net 26 as shown in FIG. 2. This deployment mechanism is straight forward, reliable and simple, acting much like a jack-in-a-box toy might operate but on a much larger scale and with a much more important purpose. Once deployed in a fully upward position which occurs in a fraction of a second when deployed, net 26 acts as an airbag-like structure but in a two axis frame thereby providing for a first element of a collision structure for a pedestrian or animal being intercepted just prior to collision. Top net frame 54 is a rounded bar with no sharp edges and in a preferred embodiment a semi-rigid rubber bar with enough structure to be connected to the array of springs 50 which drive frame 54 upwards upon the net structure and frame 54 being thrust forward from under the car thereby releasing the array of springs to drive frame 54 in a fully vertical position.

As can be seen in FIG. 2 the ideal height of frame 54 when fully deployed is controlled by the length of springs 50 and ideally extends up over the maximum height of the hood of the vehicle or automobile to which system 10 is fitted.

Deployed in a fashion as shown in the various figures, the invention causes the pedestrian or animal being struck to alter the relative direction of travel when struck to prevent the pedestrian or animal from being run over by the vehicle or more seriously injured than otherwise might be the case by striking the center of the bumper of most vehicles. The invention changes the dynamics of a collision process in a fashion capturing the pedestrian or the animal being struck to provide for the expansion of collision energy over a longer period of time and over the front of the vehicle rather than underneath the bumper and wheels of the striking vehicle. While injury cannot be entirely prevented, the invention provides a simple mechanism which alters the dynamics of the collision process in a fashion which will mitigate more serious injuries than otherwise would be observed by an unprotected vehicle.

In considering FIG. 2 more closely, it can be appreciated that once the invention is deployed in a protective mode as shown in the figure, any retraction of the protection mechanism must occur manually after a complete inspection of system 10 to be certain that it may be available to protect from a collision in the future. While it is contemplated that the system 10 might be reusable, most collisions which will cause its deployment may require a change of top net frame 54, or one or more of the springs 50 if damaged, as well as net 26 which extends the entire plane of the array of springs 50 and which, along with springs 50, may be deformed by the energy experienced in an impact in which system 10 is deployed.

Figure 3:
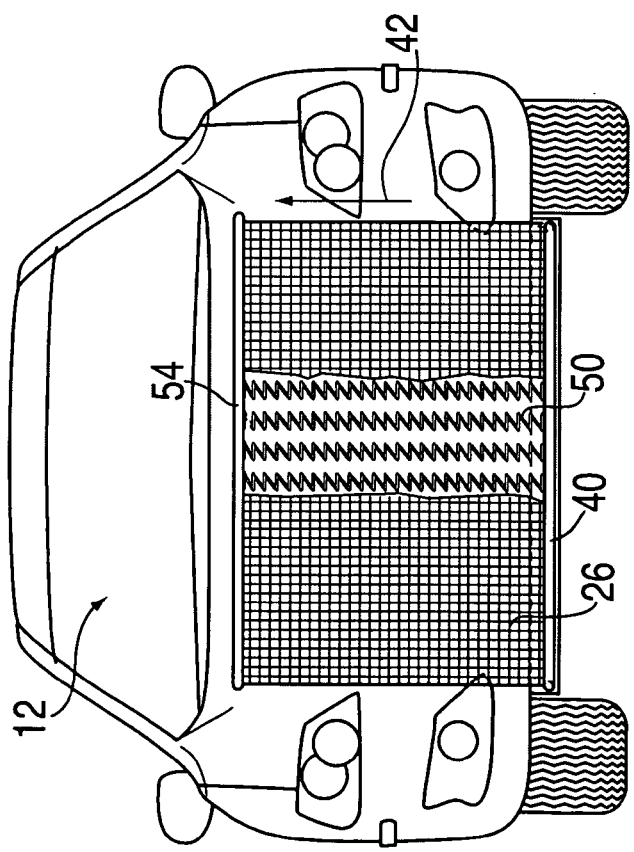
FIG. 3 is a front view of the invention fully deployed in front of a vehicle to be protected.

Turning now to FIG. 3, a front view of the invention is disclosed. It can be appreciated that in the fully extended position, net 26 is a flat structure supported in front of and by the array of springs 50 which deploy top net frame 54. During a collision, net 24 will bend inwards toward the vehicle providing a curve-like or deflected wall. The top of net frame 54 will be deflected towards the top of the hood of the vehicle thereby providing a surface which conforms more to the slipstream of the vehicle, providing a surface which reduces the possibility that a person being struck by net 26 will be pushed underneath vehicle 12 as opposed to riding over the vehicle onto the hood. At the same time, the invention provides that the person or animal being struck is restrained to a certain extent by being partially caught within net 26.

Figure 4:
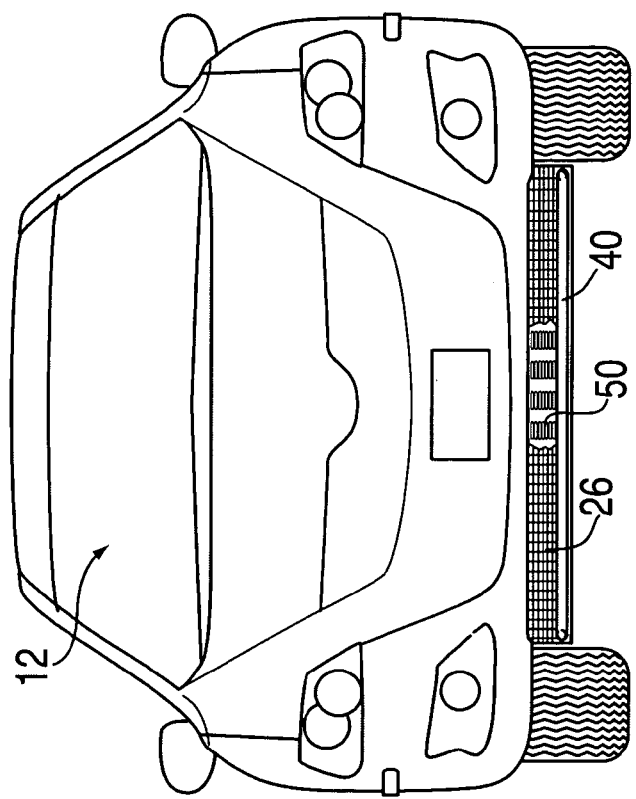
FIG. 4 is a front view of the net system in the fully compressed position prior to deployment.

Turning to FIG. 4, another view of the invention in the un-deployed position is presented. It can be appreciated by considering FIG. 4 that the upper track 22 and lower track 40 serve to keep the array of springs 50 compressed when top net bar 54 is held rigidly by the rail system once compressed. Upon deployment, the entire net structure is deployed outward in direction 46 in front of the vehicle thereby allowing the springs to instantly expand as they become unrestrained, creating the net system to intercept the object to be captured.

The invention has been described in various different embodiments, but there will be adjustments and modifications that become apparent to those skilled in the art once studying the enclosure and the included sketches used to explain the invention. Each of the variations which may be apparent from this disclosure are also claimed to be within the scope of the invention.

What is claimed is:

1. An apparatus for mitigating a collision between an object and a vehicle comprising a deployable net including:

a system of rail tracks disposed under the front of a vehicle to provide for the forward extension of at least two rails;

said rail tracks being attached on the left and right underside of said car and attached to a lower frame bar extending across the width of said vehicle;

at least two rails attached to a lower net frame and an upper net frame operatively connected in slidable engagement with said rail tracks to extend forward and outward from said rail tracks when deployed;

an array of springs connected between said lower net frame and said upper net frame disposed to allow the seated and stored compression of said array of springs by containment of said upper frame;

a deployment spring normally in a compressed mode connected between an anchor underneath said vehicle and an extension rod connected to both said rails such as to expel said rails in an outward direction upon release by a control mechanism, said control mechanism being operatively connected to a collision sensing system;

whereby further said array of springs decompresses and provides an upward motion of the top frame thereby presenting a generally rectangular plane disposed to intercept any person or animal which may be in close proximity to the automobile to which the device is configured;

whereby further a net is attached between said upper net frame and the lower net frame thereby extending said net into said rectangular configuration upon deployment.

2. An apparatus for mitigating a collision between an object in the front of a vehicle and a moving vehicle comprising:

a frame comprised of an upper and lower frame to which multiple springs are attached thereby presenting a substantially rectangular plane when said springs are not compressed;

a net attached between said upper and lower frame placed in front of said springs disposed to present a generally flat surface when said springs are fully expanded;

a rail system for attachment underneath a vehicle to provide for movement of said upper and lower frames when said upper frame is fully compressed against said multiple springs;

a release device which captures said top frame member to hold said springs in a fully compressed position until released;

a rail track mechanism attached to and located below the frame of a vehicle and in slidable engagement with said rail system;

a spring mechanism to drive said upper and lower frame members outward in front of the vehicle when said spring is released; and a controller mechanism to release said spring for deploying said upper and lower frames out from said rail system to the front area of said car thereby causing said springs to expand the net attached between said upper and lower members.

3. An apparatus for intercepting a pedestrian or animal in an impending collision with a vehicle comprised of:

an expandable net structure disposed to expand from a fully collapsed mode stowed substantially below the bumper line of the vehicle to a fully expanded mode upon activation by release of energy stored in compressed springs within said net structure;

a rail system disposed substantially under the vehicle which provides for restraint of the fully collapsed net structure by retaining the compression of springs within said net structure used to deploy said structure until said structure is ready for use;

wherein further said apparatus is deployed by projecting said net structure outward from said rail system thereby causing the springs within the net structure to expand rapidly and presenting the net structure to intercept said pedestrian or animal and the vehicle.

* * * * *